Patented Sept. 12, 1922.

1,428,633

UNITED STATES PATENT OFFICE.

ADDISON F. HOFFMAN, OF PITTSBURGH, PENNSYLVANIA.

FERTILIZER MATERIAL AND PROCESS OF PRODUCING SAME.

No Drawing.     Application filed April 23, 1918. Serial No. 230,342.

*To all whom it may concern:*

Be it known that I, ADDISON F. HOFFMAN, a citizen of the United States, and a resident of Pittsburgh, in the county of Allegheny and State of Pennsylvania, have made a new and useful Invention in Fertilizer Material and Process of Producing Same, of which the following is a specification.

The present invention relates to a fertilizer material and its production by an economical process, as a by-product of the treatment of mine water.

Mine water of the kind here contemplated consists essentially of a very dilute solution containing large amounts of ferric sulphate, smaller amounts of free sulfuric acid, aluminum sulphate, ferrous sulphate, silica, calcium, magnesium, potassium, sodium compounds, phosphoric acid compounds and numerous other things including organic matter, and the results of tests indicate that the organic matter is an ingredient of prime importance in connection with the employment of the product of this process, as a fertilizer.

The formation of mine water of the kind here referred to probably takes place substantially as follows. Water and air simultaneously act upon pyrites in the coal and contiguous slates and shales, with the production of ferrous sulphate and sulfuric acid, the ferrous sulphate being at once largely oxidized and hydrolyzed to produce ferric sulphate, and the sulfuric acid acting upon various mineral matter present including iron compounds, calcium, magnesium, potassium, sodium and other metal compounds with the production of sulphates, and the solution in percolating through the soil or coal or other material takes up more or less of its organic matter in solution. The final result of such activity is a solution containing the material above described, and containing varying amounts of the materials above mentioned and others. No ordinary mine water would contain as much as 1% of iron, and in most of the mine waters the iron content is below 0.2%. In most mine waters of the Pittsburgh district, the amount of acid present is much less than 0.2% and usually materially less than 0.1%. The other ingredients are in varying amounts. The amounts of these mine waters vary a great deal, according to the seasons of the year, the amount of rainfall and other factors, but the quantities of these mine waters which are being discharged into the rivers around Pittsburgh, Pa., alone amount to millions of gallons a minute and the water of the rivers is accordingly thereby polluted, causing immense damages to shipping, piers, submerged metal work and fish life in the streams.

In accordance with the present invention, I propose to treat mine water of the character referred to, with a quantity of alkaline material sufficient to form a basic ferric sulphate which is thereby precipitated, and which can be removed from the remaining water by sedimentation and subsequent drying.

In producing a precipitate of basic ferric sulphate from mine water it is necessary to first neutralize the free acid and then one-third of that in the ferric sulphate. For example, supposing the mine water, neglecting all other compounds other than sulphuric acid and ferric sulphate, to be as follows— sulphuric acid plus ferric sulphate. By adding a proper quantity of lime stone, preferably in pulverized form, to produce basic ferric sulphate we have the equation $3H_2SO_4 + 3Fe_2(SO_4)_3 + 6CaCO_3 =$
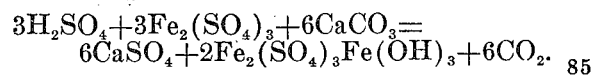
$6CaSO_4 + 2Fe_2(SO_4)_3Fe(OH)_3 + 6CO_2$.

Ferric sulphate is soluble whereas a basic ferric sulphate is insoluble. The precipitate will consist of basic ferric sulphate mixed with various other substances such as organic matter, silica, alumina, calcium sulphate, calcium phosphate etc., containing a very large percentage of water which must be removed by drying or by evaporation.

It is desirable to remove all or nearly all the water but not to carry the temperature high enough to decompose the sulphate or drive off the water of constitution.

As water acts as a catalyzer in this instance it is preferable not to use a temperature much above 100° C. as the compound is decomposed at about this temperature thus setting free sulphuric acid which may have, in the hot concentrated form, an injurious effect on the organic material.

As a source of the alkaline material, I mention calcium carbonate, marble or chalk, dolomite or magnesite, although other materials can obviously be employed if desired.

In the preferred form of my invention I mix with the mine water, such an amount of the alkaline material, preferably pulverized so that the major portion thereof will pass through a screen having 60 meshes to the inch, as will react with the sulfuric acid and ferric sulphate, and convert substantially the entire amount of ferric compounds into basic ferric sulphate, although if desired a sufficient excess over this quantity may be employed, for the conversion of a portion of the basic ferric sulphate into ferric hydroxid.

Any ferrous sulphate present (this may vary from a few per cent up to 50% of the iron content) is not appreciably affected by the pulverized lime stone but remains in solution and as not more than one-half of the total apparent acidity is neutralized this is essentially a process of partial neutralization.

This method of partial neutralization removes the acid with only one-half the lime stone or other alkaline material required for complete neutralization and leaves only half as much objectionable calcium sulphate in the waste water.

After agitating and mixing, the water is passed into a tank or basin in which it is allowed to settle, and the sludge removed and suitably dried, at a temperature preferably not above 100° C. It is not my intention to drive off any of the sulfuric acid content of the material during the drying operation. The dried product is then ready for shipment or for mixing with other fertilizer ingredients.

This material as above stated, contains a considerable amount of the organic material originally present in the mine water, which material has been shown by experiments to have a profound effect upon the employment of the product as a fertilizer or fertilizer ingredient. Experiments have clearly demonstrated that basic ferric sulphate, prepared from chemically pure materials, and applied in the same amount, to the same kind of soil, does not produce as good results in the way of plant growth, as does the product of my process containing the organic matter. It may also be true that some of the other ingredients of the product have a considerable effect upon plant growth, there being a possibility that some mine waters have absorbed, in their passage through the soil and other materials, more or less radio-active material. The basic ferric sulphate seems in some cases to retard the action of the harmful soil bacteria. The basic ferric sulphate, after application to the soil, is slowly decomposed with the production of ferric hydroxid in the hydro-gel form, in which it is highly active as an oxygenating catalyzer, leading to rapid decomposition of organic matter in the soil. The organic matter seems to have enzymic properties, to further increase the decomposition of organic matter of the soil. The ferric hydroxid produced in this condition in the soil is in a state in which it is very readily taken up by the roots of plants and absorbed thereby, and iron is known to be a necessary constituent of chlorophyl. The iron in this condition is highly active and readily assimilable by plants, whereas much of the iron naturally occurring in common soils is in an insoluable and not readily assimilable condition.

In using this material as a fertilizer, it is ordinarily advisable to mix this in relatively small amounts with larger amounts of other fertilizer material or inert material. It is usually inadvisable to directly apply to the soil more than about 20 pounds of the basic ferric sulphate material per acre of land, otherwise a detrimental toxic effect will be produced.

There should be enough calcareous material in the mixture to reduce the sulphate to the colloidal hydroxide state. It is not in all cases necessary to mix with the iron salts a calcareous material, as the soil usually contains calcareous material sufficient to cause this reduction. Basic ferric sulphate rather than the hydrate is desirable because it is a convenient and satisfactory way to handle the hydrate since the hydrate results from the decomposition of the sulphate.

Fertilizers are usually made up some months before use therefore basic ferric sulphate rather than a hydrate is desirable, for if the hydrate were used in the compound it would lose water in the course of a few months whether the mixture were either wet or dry and be changed to insoluble limonite which is practically worthless as a stimulant to plant growth. The dry basic ferric sulphate along with sufficient calcareous material to set free the iron as a hydrate can be stored indefinitely without change and on coming in contact with moisture in the soil will be changed, setting free finely divided iron hydroxide.

Instead of mixing the precipitates with a standard commercial fertilizer, pulverized lime stone, marble, dolomite or other calcareous material such as a marl or a phosphate rock or blast furnace slag may be used as a suitable filler.

The fertilizer material forming the product of the present process, in addition to its direct action, also appears to exercise a catalytic effect in setting free or rendering available the potash and phosphoric acid normally present in the soil, in which they exist as insoluble and hence unavailable compounds. The material also apears to be of considerable value acting as an absorbent for nitrogen compounds, either ammonium compounds, nitrates or nitrites, thereby preventing loss of these valuable ingredients by leaching and volatilization.

The use of this material also gives the plants, as well as the fruits or vegetables produced, a healthy color and good appearance. The leaves of the plants assume a brilliant deep green color, as compared with a yellowish green color frequently observed in plants which are not vigorous. The use of this fertilizer also greatly increases the rate of growth of plants and the rate of development of the plants, so that plants will grow and reach maturity in a much shorter time when using this fertilizer.

Having thus described my invention what I claim is—

1. A fertilizer material precipitated from acid coal mine water by partial neutralization of its ferric sulphate content so that the major portion of the ferric content of the material is basic ferric sulphate, together with such organic matter as is a constituent of such water.

2. A fertilizer material precepitated from acid coal mine water by partial neutralization of its ferric sulphate content so that the major portion of the ferric content is basic ferric sulphate, mixed with calcareous material in amounts sufficient to decompose the basic ferric sulphate in the presence of moisture.

3. A fertilizer material comprising a precipitate derived by partial neutralization of the ferric sulphate found in acid coal mine water, such organic matter as is a constituent of such water and alkaline material in amounts sufficient to decompose the basic ferric sulphate content in the presence of moisture.

4. The process of treating acid mine water containing ferric sulphate and other ingredients, which consists in adding thereto alkaline material in amounts sufficient to neutralize the free acid content thereof and a further amount sufficient to convert the major part of the ferric sulphate content into basic ferric sulphate whereby a precipitate containing basic ferric sulphate and other constituents is produced, separating the precipitate from the treated mine water and at least partially drying the precipitate and during the drying and subsequent operations avoiding such temperatures as would drive off the sulphur trioxide from the basic sulphate.

In testimony whereof, I have hereunto subscribed my name this 19th day of April, 1918.

ADDISON F. HOFFMAN.